(No Model.)
H. H. MONROE.
ROTARY HARROW.
No. 441,851. Patented Dec. 2, 1890.
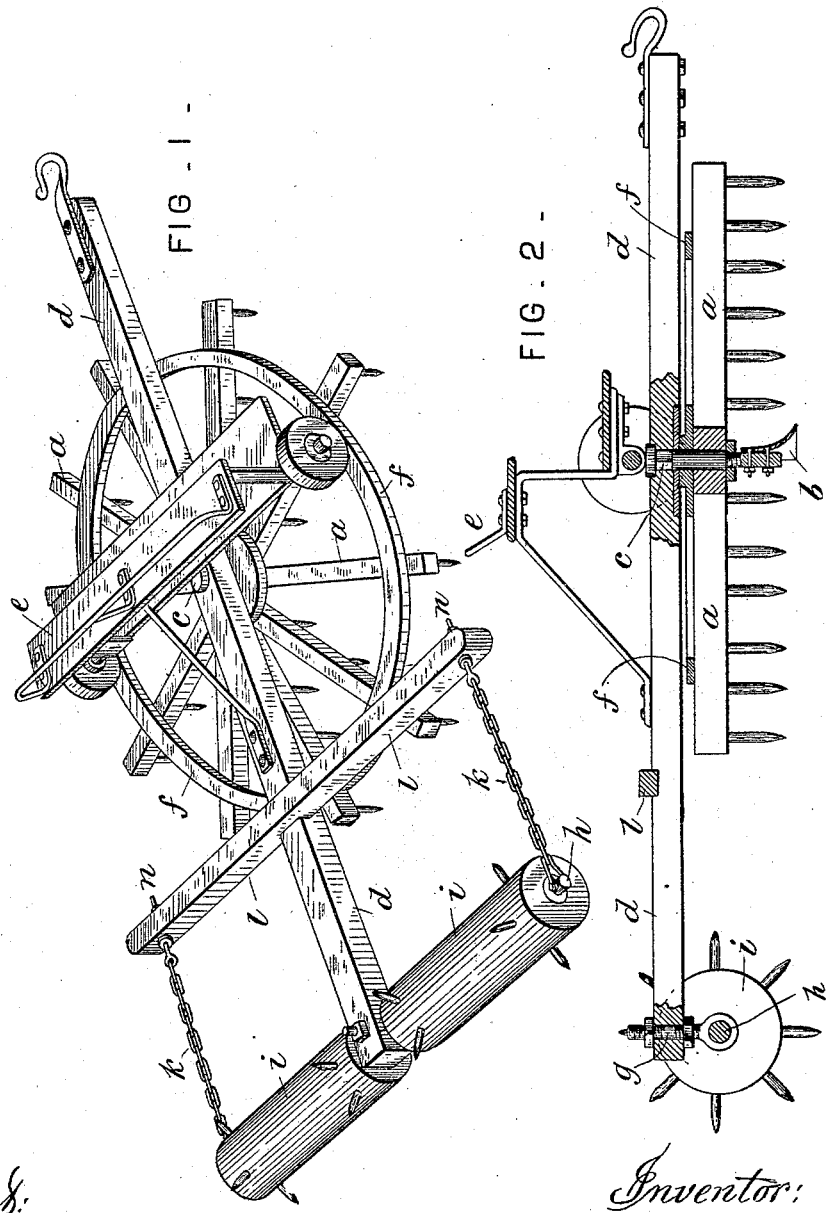

UNITED STATES PATENT OFFICE.

HALSEY H. MONROE, OF ROCKLAND, ASSIGNOR TO THE L. C. WYMAN COMPANY, OF PORTLAND, MAINE.

ROTARY HARROW.

SPECIFICATION forming part of Letters Patent No. 441,851, dated December 2, 1890.

Application filed November 19, 1889. Serial No. 330,935. (No model.)

*To all whom it may concern:*

Be it known that I, HALSEY H. MONROE, of Rockland, in the county of Knox and State of Maine, have invented certain new and useful Improvements in Rotary Harrows, of which the following is a specification.

My invention has for its object the provision of such improvements in rotary harrows as will result in a more effective working of the ground over which the implement passes than has heretofore been accomplished by similar machines.

It is also the object of my invention to provide such improvements in rotary harrows as will lighten their draft, while at the same time increasing the efficiency of their operation.

It is also the object of my invention to provide improved means for keeping the harrow in direct line with the draft of the team.

It is also the object of my invention to provide improved means for regulating the depth of working of the harrow-teeth.

It is also the object of my invention to provide other improvements in rotary harrows incidental to those above mentioned.

To these ends my invention consists, first, in providing a rotary harrow with a plow attached to the harrow-frame at a central point, so that while a furrow will be made by the plow it will also be closed by the operation of the harrow therearound and thereover, and thus actually plow and harrow the ground at the same time; second, in connecting the rear end of the draft-beam with the axle or shaft of a roller or rollers, whereby the draft is lightened by keeping the harrow in direct line with the pull of the team and other beneficial results are attained; third, in providing means for adjusting the rear end of the draft-beam with respect to the axle of the roller or rollers with which it is connected to regulate the working depth of the harrow-teeth; fourth, in providing means for the adjustment of the position of the roller or rollers before mentioned with respect to the harrow proper, whereby several desired ends are attained.

A way of constructing and using my improved harrow will first be described, and the invention will subsequently be pointed out in the claims.

Reference is to be had to the accompanying drawings, and to the letters of reference marked thereon, forming a part of this specification, the same letters designating the same parts in both views.

In the drawings, Figure 1 is a perspective view of a harrow embodying my improvements. Fig. 2 is a longitudinal vertical sectional view of the same.

In the drawings, $a$ designates the harrow proper, which is of the rotary class, and operates as and performs the usual functions of the said class of harrows.

$b$ designates a plow secured to the harrow proper at a central point, preferably to the king-bolt $c$, as shown, the said king-bolt being squared at its upper end, where it passes through the draft-beam $d$, or otherwise constructed and arranged so that it may be held stationary, and at the same time serve as a hub upon which the harrow may rotate. $e$ is the seat provided at its ends with wheels adapted to travel upon the circular rim or track $f$ as the harrow rotates. With this organization the plow will make a furrow in the ground, which furrow the operation of the harrow thereover will close, so that in passing with the implement between rows of potatoes, corn, or other growing crops the ground may be thoroughly worked by both plowing and harrowing it at the same time.

The parts and features of the invention thus far described, it will be seen, may be applied as well to a handled harrow as to a sulky harrow like that herein shown. The draft-beam $d$ extends some distance to the rear of the harrow $a$, where it is attached to an eyebolt $g$, which at its lower end embraces the axle or shaft $h$, upon which rollers $i$ rotate, said rollers being provided with radially-projecting pins $j$ to insure their rotation over the ground. The ends of the shaft $h$ are connected by means of chains $k$ with the ends of a cross-bar $l$, secured to the draft-bar $d$ at a point just at the rear of the harrow. The rear end of the draft-bar is made vertically adjustable on the eyebolt $g$ by means of the nuts $m$ on said bolt above and below the beam, and the chains $k$ are likewise adjustably connected with the ends of the cross-bar $l$ by means of the nuts $n$.

By adjusting the rear end of the draft-bar up and down on the bolt $g$ the working depth of the harrow-teeth and the plow $b$ can be regulated with great nicety, and by adjusting the chains with respect to the cross-bar $l$ the angle at which the rollers $i$ will travel with respect to the harrow or line of draft can be regulated in like manner.

By the construction and arrangement of parts described I am enabled to greatly lighten the draft of the harrow by keeping it in direct line with the pull of the team. I am also enabled to dispense with the usual friction-wheel in rotary harrows, the office of which is to keep it in a line of travel corresponding to the draft of the team, and, furthermore, the harrows may be revolved with less pressure and will run steadier and in a more nearly level position than where the friction-wheel is employed.

The chains $k$ afford an efficient means for giving an endwise pull to the rollers, so that the harrow can be readily turned.

It is obvious that changes may be made in the form and arrangement of parts comprising my improvements without departing from the nature or spirit of the invention, and, as has been shown, parts of the invention may be usefully employed in harrows in connection with other and different parts from that herein shown.

I declare that what I claim is—

1. A rotary harrow provided with a roller or rollers in the rear thereof, with which rollers the draft-beam is adjustably connected, as set forth.

2. A rotary harrow provided with rollers having radially-projecting pins in the rear thereof, between which rollers the draft-beam is adjustably connected, as set forth.

3. In a rotary harrow, the combination, with the draft-beam and cross-bar $l$, of the rollers $i$ and chains connecting the ends of the axle or shaft of said rollers with said cross-bar, and the draft-bar being connected with said axle between the said rollers, as set forth.

4. In a rotary harrow, the combination, with the draft-beam and cross-bar $l$, of the rollers $i$, and chains connected at one end with the axle or shaft of the rollers, and adjustably connected at the other ends to the ends of said cross-bar, as set forth.

5. A rotary harrow having a plow secured thereto at a central point, with a roller or rollers in the rear thereof, and a draft-beam adjustably connected with the roller or rollers to regulate the depth at which the harrow and its plow may operate in the earth, as set forth.

6. A rotary harrow having a plow connected with the king-bolt thereof, a roller or rollers in the rear of the harrow, and a draft-beam adjustably connected with the roller or rollers, as set forth.

7. A rotary harrow having a plow connected with the king-bolt thereof, combined with rollers arranged in the rear of the harrow and the draft-beam adjustably connected with the said rollers at a point between the same, as set forth.

In testimony whereof I have signed my name to this specification, in the presence of two subscribing witnesses, this 16th day of October, A. D. 1889.

HALSEY H. MONROE.

Witnesses:
C. F. BROWN,
A. D. HARRISON.